United States Patent
Huang et al.

(10) Patent No.: US 11,740,413 B1
(45) Date of Patent: Aug. 29, 2023

(54) DUPLEX OPTICAL CONNECTOR WITH LATERALLY REPOSITIONABLE CONNECTORS AND PULL BOOT RELEASE

(71) Applicants: Suncall America Inc., Carrollton, TX (US); Suncall Technologies (SZ) Co., LTD, Shenzhen (CN)

(72) Inventors: Youbiao Huang, Shenzhen (CN); Xiaohui Liu, Shenzhen (CN); Qiyue Wang, Shenzhen (CN); Masaya Nakagawa, Shenzhen (CN); Akira Kodama, Shenzhen (CN); Akira Motofuji, Kyoto (JP)

(73) Assignees: SUNCALL AMERICA INC., Carrollton, TX (US); SUNCALL TECHNOLOGIES (SZ) CO., LTD, Shenzhen (CN)

( * ) Notice: Subject to any disclaimer, the term of this patent is extended or adjusted under 35 U.S.C. 154(b) by 8 days.

(21) Appl. No.: 17/684,833

(22) Filed: Mar. 2, 2022

(51) Int. Cl.
*G02B 6/38* (2006.01)

(52) U.S. Cl.
CPC ......... *G02B 6/3871* (2013.01); *G02B 6/3831* (2013.01); *G02B 6/3849* (2013.01); *G02B 6/38875* (2021.05)

(58) Field of Classification Search
None
See application file for complete search history.

(56) References Cited

U.S. PATENT DOCUMENTS

| | | |
|---|---|---|
| 6,250,817 B1 | 6/2001 | Lampert et al. |
| 6,254,418 B1 | 7/2001 | Tharp et al. |
| 6,863,556 B2 | 3/2005 | Viklund et al. |
| 9,557,495 B2 | 1/2017 | Raven et al. |
| 9,869,825 B2 * | 1/2018 | Bailey .................. G02B 6/3858 |
| 10,067,301 B2 | 9/2018 | Murray et al. |
| 10,545,296 B2 | 1/2020 | Murray et al. |
| 10,830,963 B2 | 11/2020 | Elenbaas et al. |
| 11,079,556 B2 | 8/2021 | Murray et al. |
| 2011/0299814 A1 | 12/2011 | Nakagawa |
| 2012/0308183 A1 | 12/2012 | Irwin et al. |
| 2013/0301994 A1 | 11/2013 | Motofuji |
| 2019/0154922 A1 * | 5/2019 | Elenbaas ................ G02B 6/387 |
| 2021/0080654 A1 | 3/2021 | Elenbaas et al. |
| 2021/0356677 A1 | 11/2021 | Murray et al. |

* cited by examiner

*Primary Examiner* — Jerry Rahll

(74) *Attorney, Agent, or Firm* — Suiter Swantz pc llo

(57) ABSTRACT

A duplex optical connector includes a holder, a pair of optical connectors rotatably disposed in the holder, a cable boot slidably attached to the holder, and a clip removably attached to the holder. The clip functions to maintain a lateral position of the optical connectors relative to the holder and transfer applied force on the pull boot into actuating force on the connector latches. Connector openings formed in the holder are elongated in the lateral direction to provide separate use and polarity reversal connector positions, wherein the connectors non-rotatably engage the holder in their use position and rotatably engage the holder in their polarity reversal position.

20 Claims, 10 Drawing Sheets

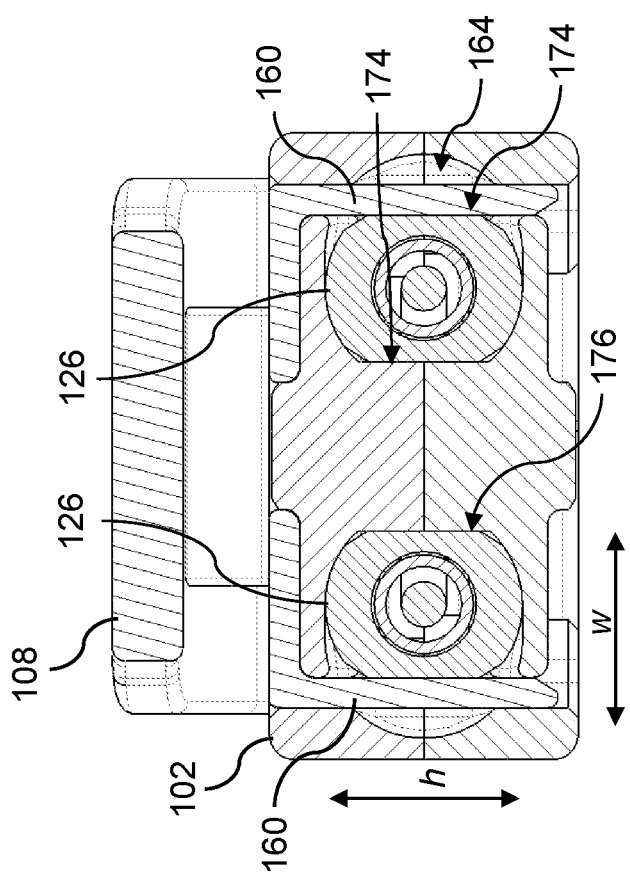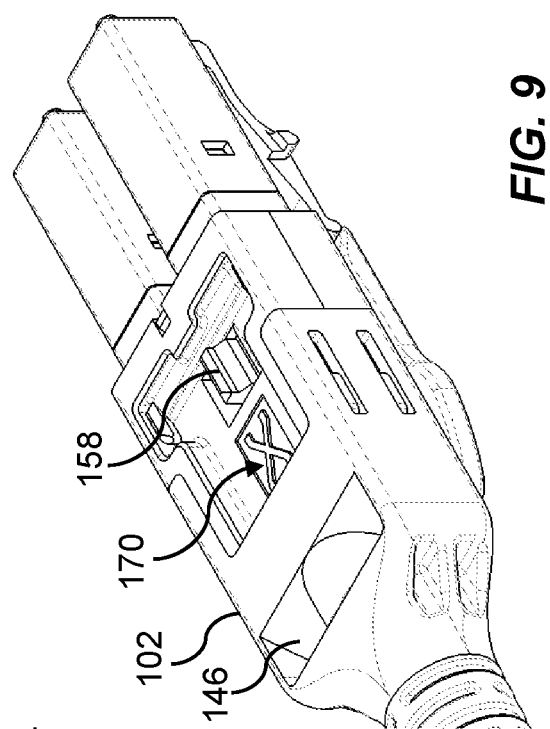

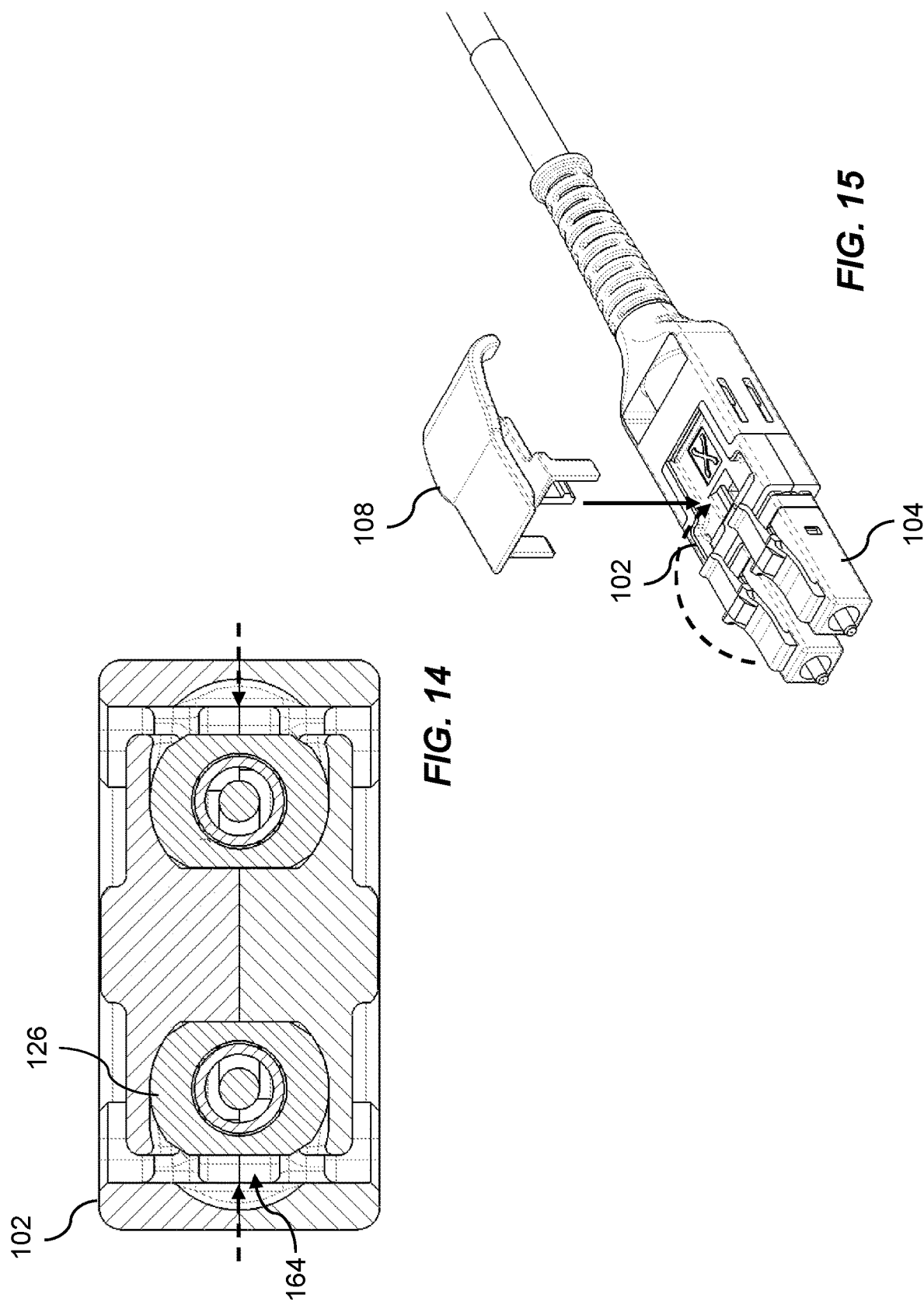

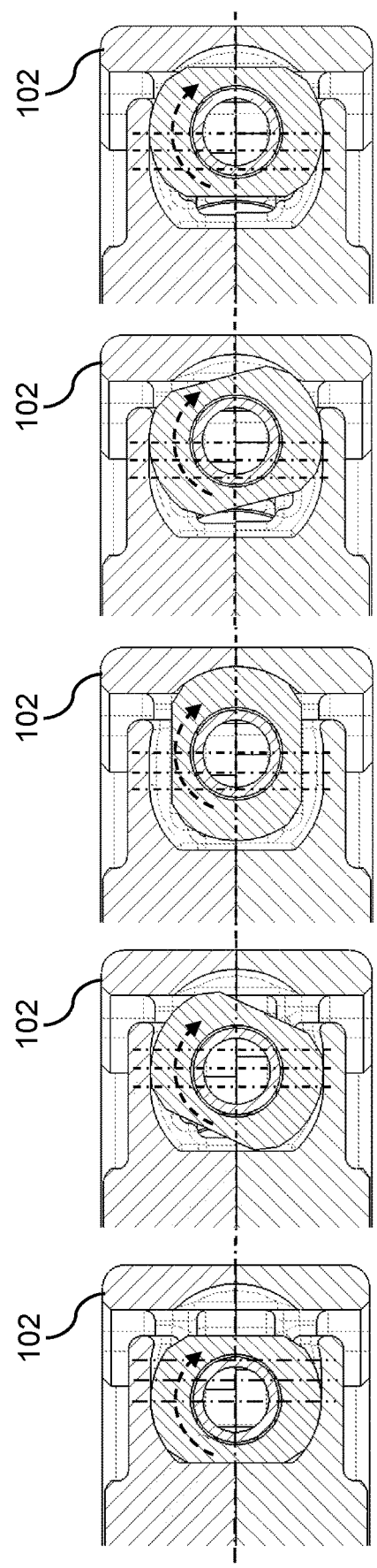

DUPLEX OPTICAL CONNECTOR WITH LATERALLY REPOSITIONABLE CONNECTORS AND PULL BOOT RELEASE

TECHNICAL FIELD

The present disclosure relates generally to optical fiber connectors, and more particularly, to a duplex optical connector with polarity reversal and pull boot latch release.

BACKGROUND

Duplex optical connectors are known for terminating duplex cables formed by a pair of optical fibers disposed inside a single covering tube. Conventional duplex connectors include a pair of optical connectors, a holder for holding the pair of optical connectors, and a boot fitted to the holder. The dual cable is fixed to the holder, and the pair of optical fibers bifurcate inside the holder so as to be connected to the optical connectors. The boot forms a central passage defining a central axis receiving the duplex cable. The boot is attached to the cable to provide strain relief.

Each optical connector is configured to be received in an opening formed in an adapter, module, cassette, or other device for facilitating optical connections. Each optical connector typically includes a latch configured to engage in a formed catch located inside the opening. In use, advancing the optical connector in the opening deflects the latch, typically in the direction of the connector body, such that the connector can continue to be advanced in the opening. When fully seated in the opening, the resiliency of the latch causes a return toward the initial position of the latch thereby engaging the latch in the respective catch. To release the optical connector from the device, the latch is depressed toward the connector body such that the latch clears the catch, thereby allowing the connector to be withdrawn from the opening.

As the demand for capacity increases so does the density of optical connectors. Increased connection density results in a decrease in the empty space surrounding the connectors for accessing the latches. In high-density and ultra-high-density installations, separate actuators such as pull tabs have been developed to facilitate remote latch release. While effective in some applications, separate actuators increase the connector profile, complexity, and cost. In addition, separate actuators can become detached and lost, leaving the installer without means to remove the connector.

Therefore, there remains a need for a duplex connector that can be remotely released without increasing the connector profile, complexity, and part count, and with a configuration that facilitates polarity reversal and ferrule alignment.

BRIEF SUMMARY OF THE INVENTION

According to a first aspect, embodiments of the present disclosure are directed to a duplex optical connector including a holder defining a pair of connector openings, a pair of optical connectors rotatably disposed in the pair of connector openings, a cable boot slidably attached to the holder, and a clip removably attached to the holder. Each optical connector includes a connector housing having a latch arm provided on one side of the connector housing. The clip includes a pair of spaced clip arms and a lever, the pair of spaced clip arms configured to engage the pair of optical connectors to maintain a lateral position of the optical connectors relative to the holder, and the lever having a first end configured to engage the latch arms and a second end configured to engage the cable boot. Each connector opening is elongated in a lateral direction of the holder to provide a first connector position for use of the pair of optical connectors to perform optical connections, and a second connector position for polarity reversal of the pair of optical connectors. Pulling force applied to the cable boot causes the second end of the lever to lift and the first end of the lever to lower thereby simultaneously urging the latch arms toward their respective connector housing.

In some embodiments, the pair of optical connectors, when in the first connector position, non-rotatably engage the holder, and the pair of optical connectors, when in the second connector position, rotatably engage the holder.

In some embodiments, each optical connector further includes a ferrule held in the connector housing and an end cap attached to the connector housing, the end cap rotatably disposed in the holder and defining a pair of diametrically opposed facets. In the first connector position the pair of diametrically opposed facets respectively engage one of the spaced clip arms and a flat wall of the holder to prevent rotation of the pair of optical connectors relative to the holder. In the second connector position and with the clip detached from the holder, the pair of diametrically opposed facets are out of engagement with the holder to allow rotation of the pair of optical connectors relative to the holder.

In some embodiments, each connector opening has a width greater than an outer diameter of the end cap to permit lateral movement of the optical connector relative to the holder, and each connector opening has a height substantially equal to the outer diameter of the end cap to prevent vertical movement of the optical connector relative to the holder.

In some embodiments, the holder includes first and second parts that attach to define the pair of connector openings at one end of the holder, a cable opening at an opposing end of the holder, and closed sides. The first part forms a top of the holder and defines a first opening configured to receive a latch of the clip, and first part includes a first indicia indicating a first polarity of the duplex optical connector. The second part forms a bottom of the holder and defines a second opening configured to receive the latch of the clip, and the bottom part includes a second indicia indicating a second polarity of the duplex optical connector.

In some embodiments, the pair of optical connectors are independently rotatable in opposite directions relative to the holder to reverse polarity of the duplex optical connector.

In some embodiments, the clip further comprises a latch configured to be received in the holder, and wherein the lever, the spaced clip arms, and the latch are integrally formed.

In some embodiments, the cable boot includes two pairs of spaced ramps, one pair of the spaced ramps provided on each side of the cable boot, and each pair of the spaced ramps recessed relative to its respective side of the cable boot and inclined in a direction of the holder.

In some embodiments, the second end of the lever defines a pair of spaced arms, each of the spaced arms of the lever configured to slidably engage one of the spaced ramps.

In some embodiments, each latch arm is obliquely angled relative to its respective connector housing, biased in a direction away from its respective connector housing, and detached from the first end of the lever.

According to another aspect, embodiments of the present disclosure are directed to a cable assembly including a duplex cable including a pair of optical fibers disposed inside a single covering tube, and a duplex optical connector terminating one end of the duplex cable. The duplex optical connector includes a holder, a pair of optical connectors rotatably disposed in the holder, a cable boot slidably attached to the holder and receiving and detached from the duplex cable, and a clip removably attached to the holder, the clip having a pair of spaced clip arms and a lever, the pair of spaced clip arms configured to engage the pair of optical connectors to maintain a lateral position of the optical connectors relative to the holder, and the lever having a first end configured to engage connector latch arms and a second end configured to engage the cable boot. Each connector opening is elongated in a lateral direction of the holder to provide the first and second connector positions for respective use and polarity reversal.

According to yet another aspect, embodiments of the present disclosure are directed to a duplex optical connector including a holder, a pair of optical connectors rotatably disposed in the holder, a cable boot slidably attached to the holder, and a clip removably attached to the holder, the clip having a pair of spaced clip arms configured to engage the pair of optical connectors to maintain a lateral position of the optical connectors relative to the holder. Each connector opening is elongated in a lateral direction of the holder to provide the first and second connector positions for respective use and polarity reversal.

BRIEF DESCRIPTION OF THE DRAWINGS

Implementations of the inventive concepts disclosed herein may be better understood when consideration is given to the following detailed description thereof. Such description refers to the included drawings, which are not necessarily to scale, and in which some features may be exaggerated, and some features may be omitted or may be represented schematically in the interest of clarity. Like reference numbers in the drawings may represent and refer to the same or similar element, feature, or function. In the drawings:

FIG. 8 is a lateral cross-section of the duplex optical connector illustrating the first connector position;

FIG. 9 is a perspective view of a portion of the duplex optical connector illustrating the clip latch and polarity indicator;

FIG. 14 is a lateral cross-section of the duplex optical connector illustrating connector movement to the first connector position;

FIG. 15 is a perspective view of the duplex optical connector illustrating reversed polarity and clip re-attachment; and FIGS. 16A-E are sequential cross-section views illustrating connector repositioning and polarity reversal movements.

DETAILED DESCRIPTION

Figure 1:
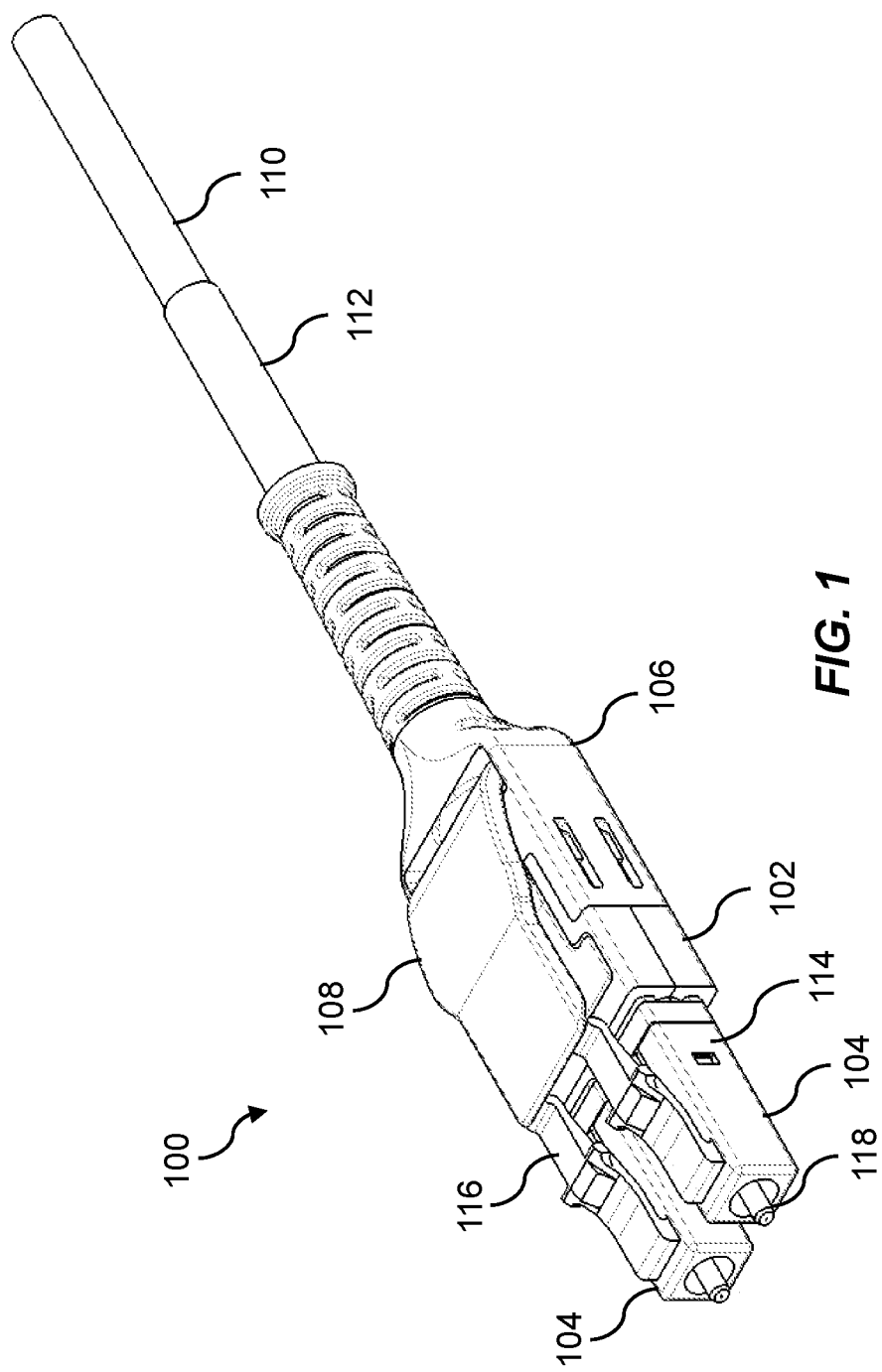
FIG. 1 is a perspective view illustrating a duplex optical connector according to an embodiment of the present disclosure.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein, any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly speaking, the inventive concepts disclosed herein are directed to duplex optical connectors for use in high-density applications. In embodiments, the present disclosure provides a duplex optical connector configured with a pull boot for latch release, and connectors repositionable between discrete use and polarity reversal positions.

Referring to FIG. 1, a preferred embodiment of a duplex optical connector according to the present disclosure is shown generally at 100. The duplex optical connector 100, also referred to herein as the "connector," generally includes a holder 102, a pair of optical connectors 104 rotatably disposed in the holder 102, and a pull boot 106 slidably attached to the holder 102. As discussed further below, a clip 108 functions to maintain lateral positioning of the connectors 104 relative to the holder 102, as well as to actuate connector latch release in response to pulling force applied to the pull boot 106, among other functions.

The pull boot 106, positioned at the 'back' of the connector 100, defines an axial passageway for receiving a fiber optical cable 110, for instance a duplex cable including a pair of optical fibers disposed inside a single covering tube. The pull boot 106 defines a proximal end that slidably engages the sides of the holder 102, and a distal end forming interconnected rings separated by gaps. In use, the pull boot 106 translates relative to the holder 102 when pulled, and the distal end prevents over-bending of the fiber optic cable 110 and facilitates gripping for pulling. The pull boot 106 further defines ramps or cams that interact with features formed on the clip 108, as discussed further below. In some embodiments, the pull boot 106 is a one-piece construction. Heat shrink tubing 112 is provided at the interface of the fiber optic cable 110 and the pull boot 106.

As shown, each optical connector 104 includes an elongated connector housing 114 having a generally square profile. A latch arm 116 is attached to one of the sides for securement in a device. In some embodiments, the connector housing 114 and the latch arm 116 are integrally formed such that the latch arm 116 is oblique to the attached side and is elongated and extends in the longitudinal direction of the connector housing 114. The latch arm 116 is resiliently deformable such that, in use, the distal end of the latch arm 116 deflects toward the connector body 114 upon engagement with an adapter, module, cassette or other device as the optical connector 104 is advanced into an opening formed in the device. A ferrule 118 is held within each connector housing 114. As shown, the optical connectors 104 are both LC type connectors, although other types of connectors can be used.

Figure 2:
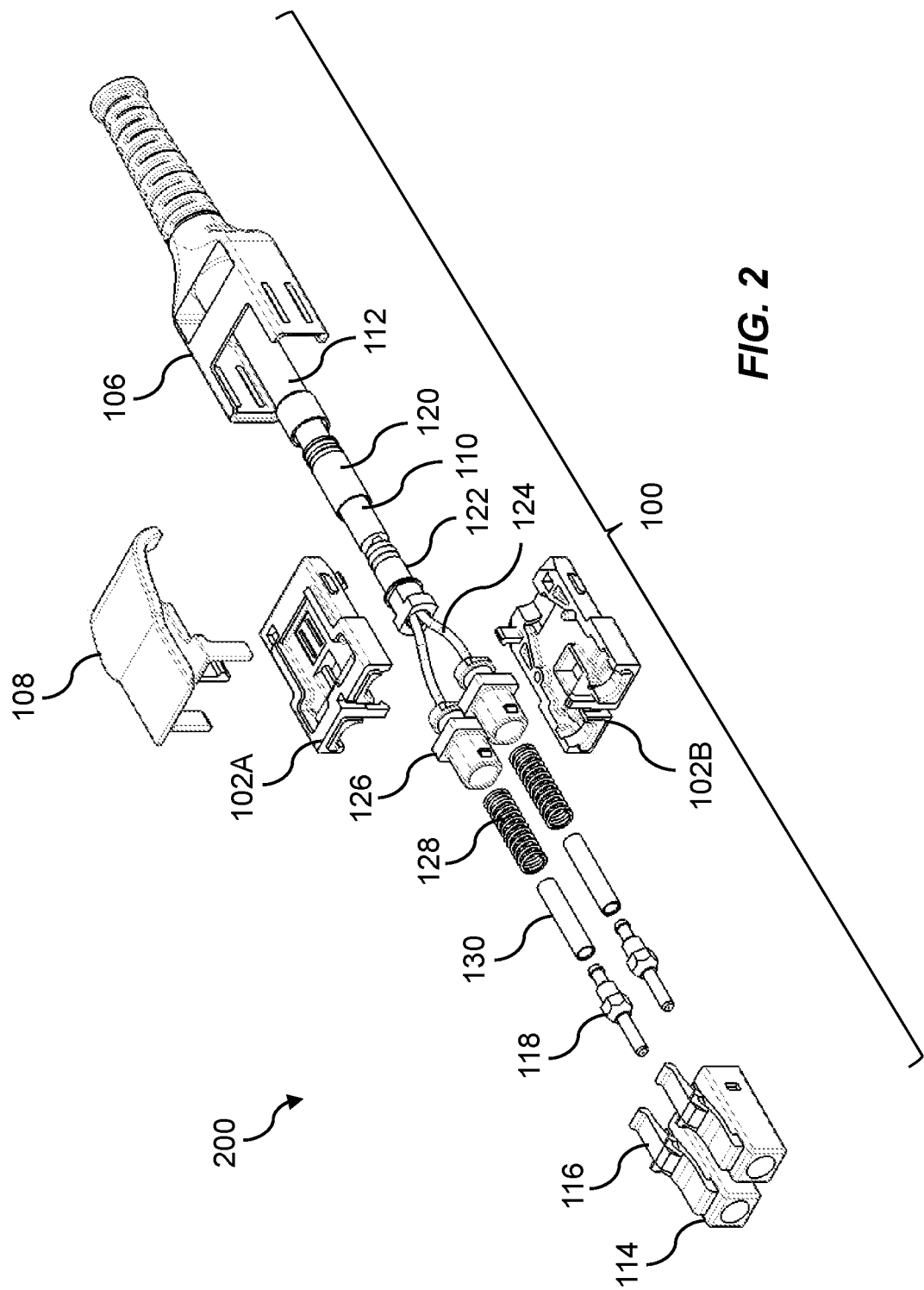
FIG. 2 is an exploded perspective view of the duplex optical connector.

Referring to FIG. 2, a cable assembly 200 includes the duplex optical connector 100 and the fiber optic cable 110. The cable assembly 200 further includes a crimp ring 120 for securing the cable tubing to one end of a furcation body 122 separating the pair of optical fibers 124. Each optical connector further includes an end cap 126 for seating a spring 128 in a compressed state to bias a plastic tube 130 and the ferrule 118 toward the forward end of the connector housing 114. Each ferrule 118 defines an insertion hole for inserting one of the bare optical fibers 124. Each ferrule 118 further defines a flanged portion engaging one end of the spring 128 to maintain the spring in the compressed state. Optional dust caps cover the ends of the optical connectors between uses.

Figures 3, 4:
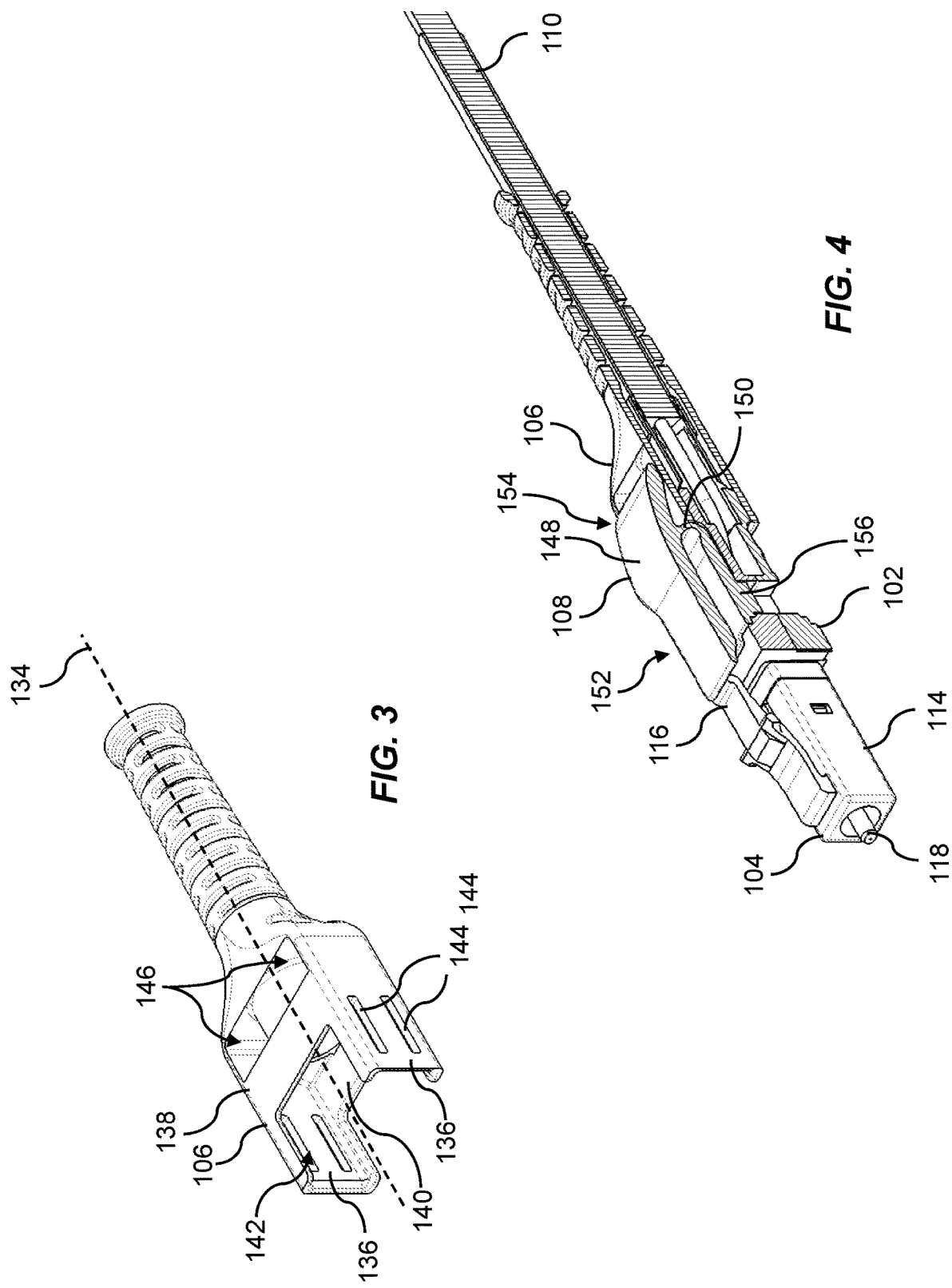
FIG. 3 is a perspective view illustrating the cable boot of the duplex optical connector.
FIG. 4 is a longitudinal cross-section of the duplex optical connector.

Referring to FIG. 3, the pull boot 106 defines a central axis 134. At the proximal end of the pull boot 106, the opposing sides 136 and opposing 'top' 138 and 'bottom' 140 collectively form an interior space 142 for receiving the holder in sliding engagement with the pull boot 106. A pair of elongated linear slots 144 defined on each of the opposing sides 136 receives a corresponding number of protruding guides defined on the outer surface of the holder to facilitate sliding engagement and maintain squareness with the holder. The length of the slots 144 can be customized to limit the axial travel length of the pull boot 106. Spaced ramps 146, provided in pairs with each pair positioned in the interior space and recessed relative to a respective one of the 'top' 138 and 'bottom' 140, function to move part of the in response to pulling force applied to the pull boot 106, as discussed further below. Each ramp 146 may be curved and is inclined in the direction of the holder.

Referring to FIG. 4, the clip 108 includes a lever 148 that functions to transfer pulling force applied to the pull boot 106 into pressing force on the latch arms 116 such that the latch arms are depressed toward their connector housing 104. The lever 148 pivots about a fulcrum 150 attached about mid-span along the length of the lever. The lever 148 defines a font end 152 that engages the separate latch arms 116, and preferably simultaneously engages both latch arms such that movement of the front end of the lever downward toward the holder 102 presses both latch arms 116 toward their respective connector housing 114 at the same time and in a substantially equal amount. The lever 148 further defines a back end 154 defining spaced lever arms that engage a respective pair of the spaced ramps of the pull boot 106. The fulcrum 150 is formed between the lever 148 and a cap 156 that attaches to the holder 102 to close out the top or bottom of the holder depending on the connector polarity. The lever 148 is elongated and may define a gradual curvature from end-to-end to maintain a low profile and prevent snagging on other cables and connectors as the connector is installed and removed.

Figure 5C:
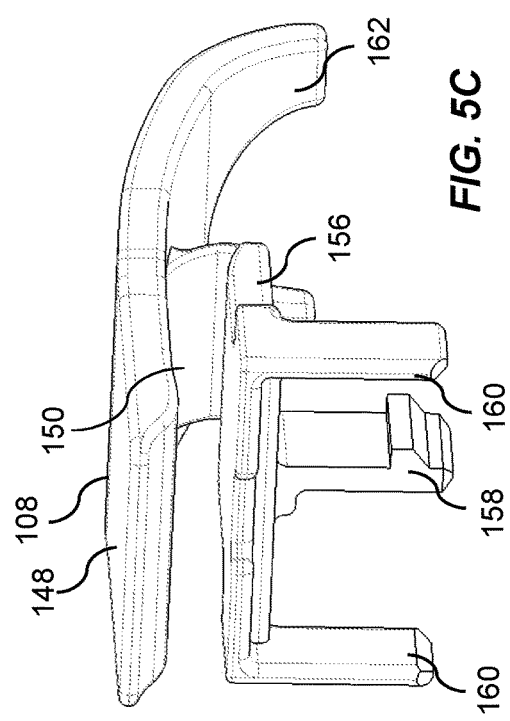
FIG. 5A-C are various perspective views illustrating the clip.
Figure 5A:
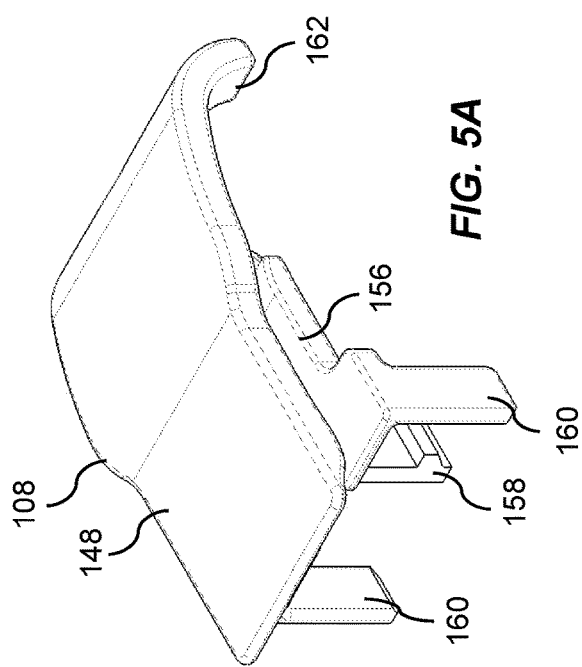
Figure 5B:
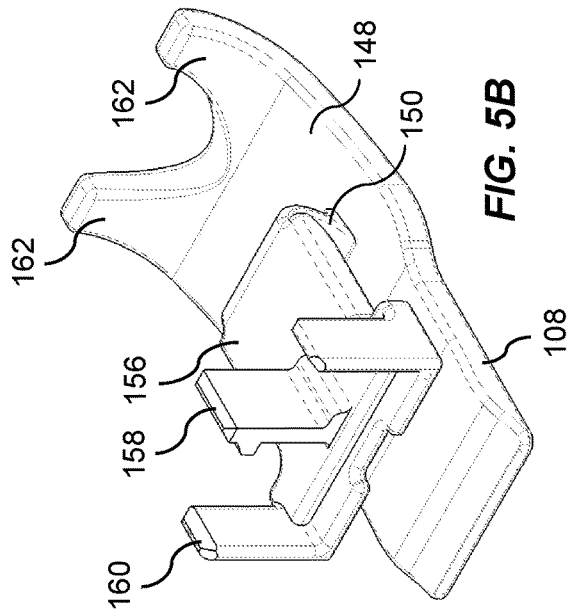

Referring to FIGS. 5A-C, the clip 108 includes the lever 148, fulcrum 150 and cap 156, and further includes a clip latch 158 and spaced clip arms 160. Each of the clip latch 158 and the spaced arms 160 extend perpendicularly from the cap 156 away from the lever 148. The clip latch 158 is configured to be received through an opening formed in the holder and is configured to interact with a catch formed in the holder to removably attach the clip 108 to the holder 102. In some embodiments, the clip latch 158 deflects to move past a catch formed in the holder, and once past, returns to its initial state such that the catches interact to prevent unintentional removal of the clip from the holder. The clip arms 160 are spaced apart a distance substantially corresponding to the spacing of the optical connectors in their functional use position, as discussed further below. The spaced clip arms 160 are received through openings formed in the holder. The lever arms 162 are spaced apart by a void configured to be positioned around a cable passage formed in the pull boot. In some embodiments, the clip 108 has a one-piece construction.

Figure 6:
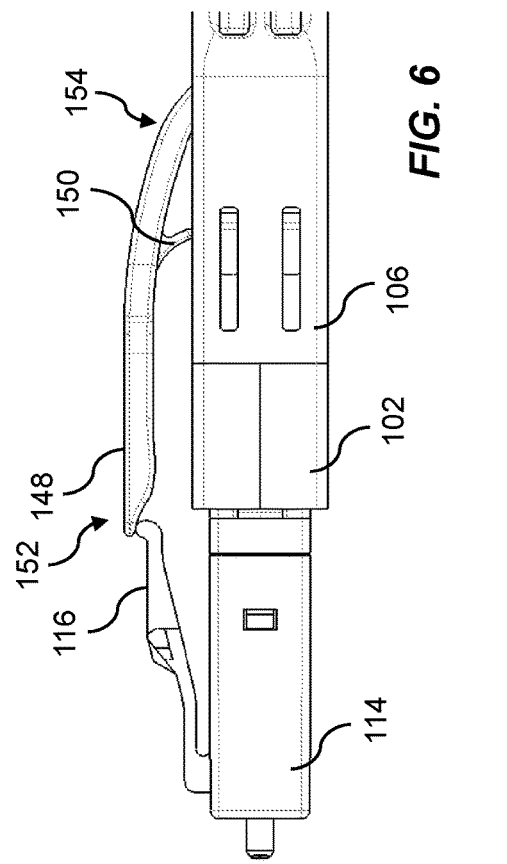
FIG. 6 is a side view illustrating engagement of the latch arms and lever end.

Referring to FIG. 6, the fulcrum 150 has a length such that the lever 148 is positioned in spaced apart relation 'above' the underlying holder 102 and pull boot 106, such that the back end 154 of the lever can be 'lifted' while the front end 152 of the lever can be simultaneously 'lowered' a sufficient distance to depress the latch arms 116 for latch release. As shown, the maximum height of the of the lever 148 is substantially equal to the maximum height of the distal end of the latch arms 116 to achieve a low-profile connector.

Referring to FIGS. 7A-D, the holder 102 is preferably constructed in two separate parts 102A, 102B, for instance halves, that attach to form the holder, for instance by snap fit engagement. As formed, the holder 102 has closed sides such that the fibers remain concealed and protected during the polarity reversal procedure. The holder 102 defines a pair of connector openings 164 at the forward end, with each connector opening configured to receive of one of the connectors. Specifically, each connector opening 164 receives an end cap 126 of one of the connectors. Each end cap 126 defines an annular groove 166 formed in its outer peripheral surface. The end caps 126 are captured between the two parts 102A, 102B as the parts are attached. The annular groove 166 facilitates rotation of the end caps 126, and therefore the connectors, relative to the holder 102 during the polarity reversal procedure.

Figure 7A:
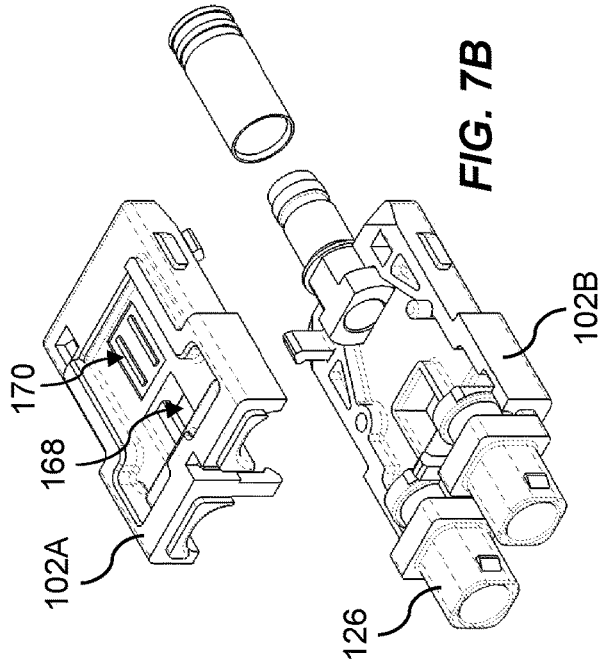
FIGS. 7A-D are perspective views illustrating holder assembly.
Figure 7B:
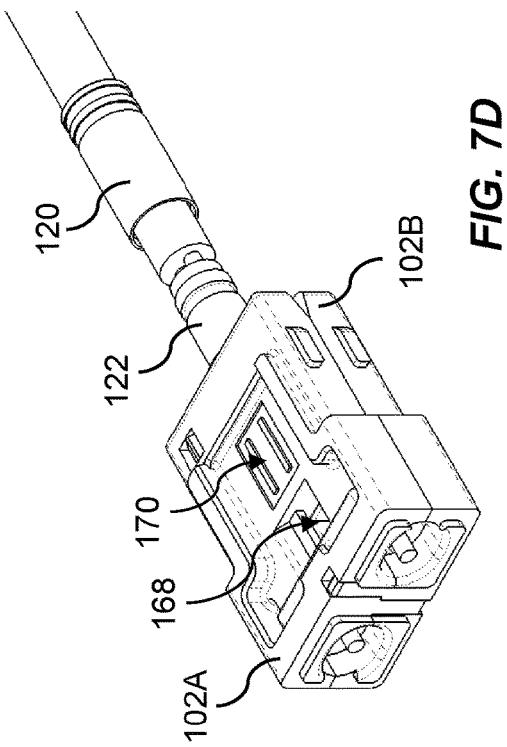
Figure 7C:
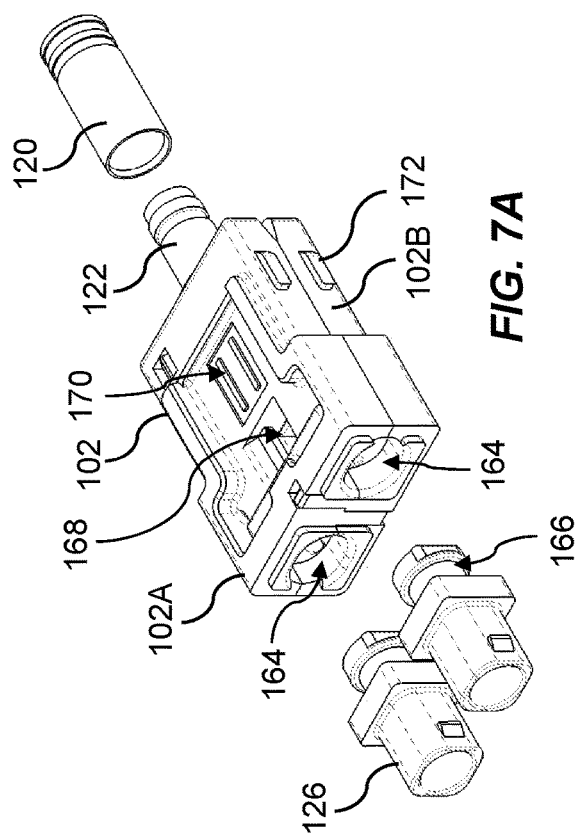
Figure 7D:
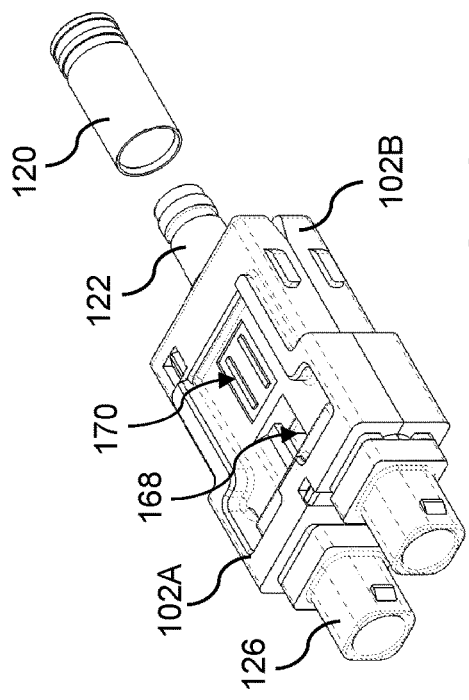

At the opposite end of the holder 102, the two parts 102A, 102B form an opening for capturing and retaining the furcation body 122 to which the crimp ring 120 attaches. Each of the two parts 120A, 120B forms a generally central through opening 168 configured to receive the clip latch. With the two parts 102A, 102B attached, their central openings 168 align such that the clip latch is received through both openings. In some embodiments, each of the first and second parts 102A, 102B further includes a polarity indicator expressed as text, symbols, etc. on a visible top surface of the respective part. As shown in several of the drawings, a first symbol may indicate a first polarity, while a second symbol may indicate a second, opposite polarity. With the clip attached, the polarity indicator is concealed beneath the cap indicating to the installer the polarity. In an embodiment, the concealed symbol (i.e., clip attachment side) may indicate the current polarity configuration. In an alternative embodiment, the revealed symbol (i.e., opposite side of clip attachment) may indicate the current polarity configuration. FIG. 7A further illustrates the protruding guides 172 configured to engage in the slots formed in the pull boot to facilitate sliding engagement.

Referring to FIG. 8, each connector opening 164 is elongated in a lateral direction of the holder 102 providing sufficient width for two discrete connector positions, namely a discrete connector use position and a polarity reversal position. In some embodiments, the width dimension w of each opening is greater than its height dimension h to allow lateral connector repositioning while constraining vertical movement. With the clip 108 attached to the holder 102, the clip arms 160 insert in the holder and are spaced such that the optical connectors are constrained against rotation and lateral movement between the spaced parallel clip arms 160. The connector configuration shown in FIG. 8 corresponds to the use position of the duplex optical connector for performing optical connections. Each end cap 126 defines a pair of diametrically opposed, parallel facets 174, wherein engagement of one of the facets with a flat wall 176 defined in the holder 102 corresponds to the first polarity, and engagement of the other of the facets with the flat wall, after 180 degrees rotation of the connector, corresponds to the second, opposite polarity. The parallel facet configuration ensures correct ferrule orientation in each of the opposite polarities. As shown, in each of the first and second polarity configurations, one facet 174 engages an inner wall formed in the holder 102 while the other facet 174 engages an inner surface of one of the latch arms 160, thereby preventing rotational movement of the connector relative to the holder 102.

Referring to FIG. 9, the 'bottom' of the assembled duplex optical connector is shown in a predetermined polarity configuration with the clip latch 158 engaged in the holder 102 and the polarity indicator 170 revealed. FIG. 9 further illustrates the pull boot ramps 146 inclined in the direction of the holder 102.

Figure 10:
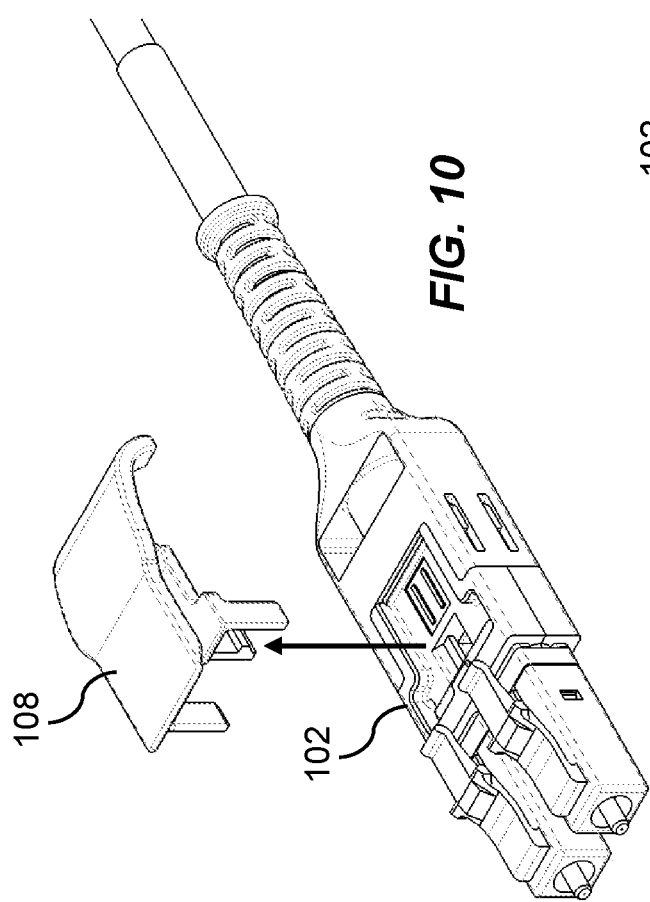
FIG. 10 is a perspective view of the duplex optical connector illustrating clip removal.
Figure 11:
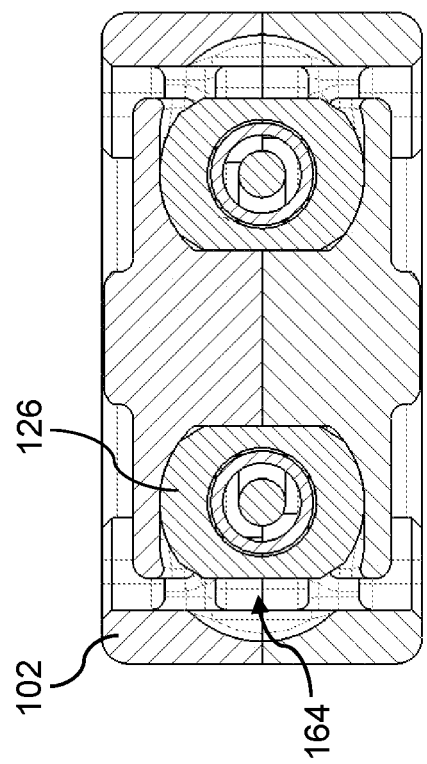
FIG. 11 is a lateral cross-section of the duplex optical connector illustrating the first connector position with the clip removed.
Figure 13:
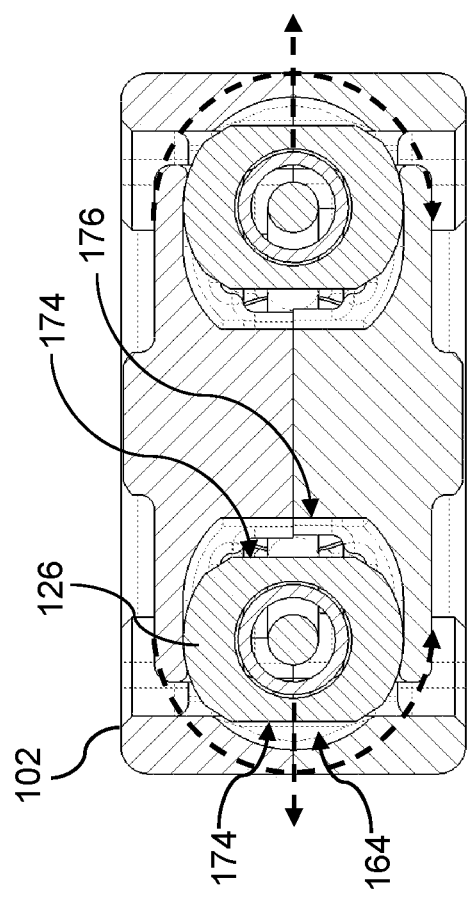
FIG. 13 is a lateral cross-section of the duplex connector illustrating the second connector position.
Figure 12:
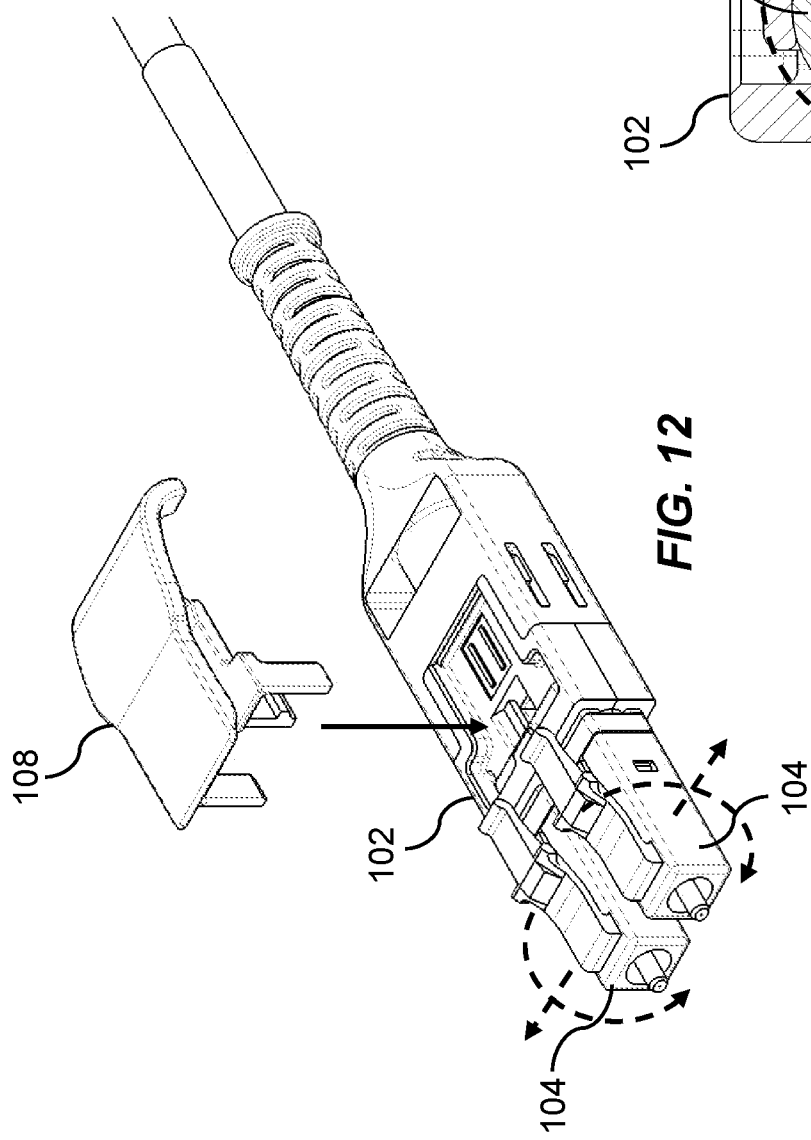
FIG. 12 is a perspective view of the duplex optical connector illustrating connector lateral repositioning and rotation.

Referring to FIGS. 10-15, the procedure for reversing polarity is illustrated. Referring to FIG. 10, in a first step, the clip 108 is detached from the holder 102. Referring to FIG. 11, detaching the clip frees the connectors, and specifically the end caps 126, allowing lateral repositioning within the respective connector openings 164. Referring to FIGS. 12 and 13, with the clip 108 detached, each connector 104 is freed to be repositioned laterally outward to a second position corresponding to a connector polarity reversal position. When moved laterally outward to the second position, or during movement of the connector 104 toward the second position, each connector 104 is rotated 180 degrees within its respective connector opening 164 to the opposite polarity. When in the second position, the diametrically opposed facets 174 are disengaged from the flat wall of the holder thereby allowing the connectors to be rotated within their openings. The optical connectors 104 are independently rotatable in opposite directions. As shown in FIG. 12, considering the close spacing of the two connectors and their protruding latch arms, the right connector is rotated clockwise, and the left connector is rotated counterclockwise.

Referring to FIG. 14, the polarity reversed connectors indicated by the end caps 126 are repositioned laterally inward to the first position into non-rotational engagement with the holder 102. Referring to FIG. 15, with the connectors 104 rotated to the opposite polarity and repositioned to the use position, the entire connector may be rotated for ease of handling and the clip 108 reattached to the side corresponding to the new polarity configuration to complete the polarity reversal and ready the clip for optical connection.

Referring to FIGS. 16A-E, the sequential steps of polarity reversal are shown illustrating connector repositioning laterally outward from the use position for forming optical connections illustrated in FIG. 16A, to the polarity reversal position illustrated in FIG. 16E, through intermediate positions illustrated in FIGS. 16B-D. In some embodiments, outward lateral movement and rotation occur simultaneously. In other embodiments, outward lateral movement may occur first followed by rotational movement. FIG. 16A illustrates non-rotational engagement of the connector with the holder 102, while FIGS. 16B-E illustrate rotational engagement with the holder 102. In all embodiments, the connectors cannot be rotated when in their use position considering the interaction of the connectors with the holder, and more particularly, the corresponding component shapes preventing connector rotation.

While the foregoing description provides embodiments of the invention by way of example only, it is envisioned that other embodiments may perform similar functions and/or achieve similar results. Any and all such equivalent embodiments and examples are within the scope of the present invention and are intended to be covered by the appended claims.

What is claimed is:

1. A duplex optical connector, comprising:
   a holder defining a pair of connector openings;
   a pair of optical connectors rotatably disposed in the pair of connector openings, each optical connector including a connector housing having a latch arm provided on one side of the connector housing;
   a cable boot slidably attached to the holder; and
   a clip removably attached to the holder, the clip having a pair of spaced clip arms and a lever, the pair of spaced clip arms configured to engage the pair of optical connectors to maintain a lateral position of the optical connectors relative to the holder, and the lever having a first end configured to engage the latch arms and a second end configured to engage the cable boot;
   wherein each connector opening is elongated in a lateral direction of the holder to provide a first connector position for use of the pair of optical connectors to perform optical connections, and a second connector position for polarity reversal; and
   wherein pulling force applied to the cable boot causes the second end of the lever to lift and the first end of the lever to lower thereby simultaneously urging the latch arms toward their respective connector housing.

2. The duplex optical connector according to claim 1, wherein:
   the pair of optical connectors, when in the first connector position, non-rotatably engage the holder; and
   the pair of optical connectors, when in the second connector position, rotatably engage the holder.

3. The duplex optical connector according to claim 1, wherein each optical connector further comprises:
   a ferrule held in the connector housing; and an end cap attached to the connector housing, the end cap rotatably disposed in the holder and defining a pair of diametrically opposed facets;

wherein, when in the first connector position, the pair of diametrically opposed facets respectively engage one of the spaced clip arms and a flat wall of the holder to prevent rotation of the pair of optical connectors relative to the holder; and wherein, when in the second connector position and with the clip detached from the holder, the pair of diametrically opposed facets are out of engagement with the holder to allow rotation of the pair of optical connectors relative to the holder.

4. The duplex optical connector according to claim 3, wherein:

each connector opening has a width greater than an outer diameter of the end cap to permit lateral movement of the optical connector relative to the holder; and each connector opening has a height substantially equal to the outer diameter of the end cap to prevent vertical movement of the optical connector relative to the holder.

5. The duplex optical connector according to claim 1, wherein:

the holder comprises first and second parts that attach together to define the pair of connector openings at one end of the holder, a cable opening at an opposing end of the holder, and closed sides;

the first part forms a top of the holder, defines a first opening configured to receive a latch of the clip, and includes a first indicia indicating a first polarity of the duplex optical connector; and the second part forms a bottom of the holder, defines a second opening configured to receive the latch of the clip, and includes a second indicia indicating a second polarity of the duplex optical connector.

6. The duplex optical connector according to claim 1, wherein the pair of optical connectors are independently rotatable in opposite directions relative to the holder to reverse polarity of the duplex optical connector.

7. The duplex optical connector according to claim 1, wherein the clip further comprises a latch configured to be received in the holder, and wherein the lever, the spaced clip arms, and the latch are integrally formed.

8. The duplex optical connector according to claim 1, wherein the cable boot comprises two pairs of spaced ramps, one pair of the spaced ramps provided on each side of the cable boot, and each pair of the spaced ramps recessed relative to its respective side of the cable boot and inclined in a direction of the holder.

9. The duplex optical connector according to claim 8, wherein the second end of the lever defines a pair of spaced arms, each of the spaced arms of the lever configured to slidably engage one of the spaced ramps.

10. The duplex optical connector according to claim 1, wherein each latch arm is obliquely angled relative to its respective connector housing, biased in a direction away from its respective connector housing, and detached from the first end of the lever.

11. A cable assembly, comprising:

a duplex cable including a pair of optical fibers disposed inside a single covering tube; and a duplex optical connector terminating one end of the duplex cable, the duplex optical connector comprising:

a holder defining a cable opening and a pair of connector openings, the cable opening receiving the pair of optical fibers;

a pair of optical connectors rotatably disposed in the pair of connector openings, each optical connector including a connector housing having a latch arm provided on one side of the connector housing, and a ferrule held in the connector housing, the ferrule terminating one of the optical fibers;

a cable boot slidably attached to the holder, and the cable boot receiving and detached from the duplex cable; and a clip removably attached to the holder, the clip having a pair of spaced clip arms and a lever, the pair of spaced clip arms configured to engage the pair of optical connectors to maintain a lateral position of the optical connectors relative to the holder, and the lever having a first end configured to engage the latch arms and a second end configured to engage the cable boot;

wherein each connector opening is elongated in a lateral direction of the holder to provide a first connector position for use of the pair of optical connectors to perform optical connections, and a second connector position for polarity reversal; and wherein pulling force applied to the cable boot causes the second end of the lever to lift and the first end of the lever to lower thereby simultaneously urging the latch arms toward their respective connector housing.

12. The cable assembly according to claim 11, wherein:

the pair of optical connectors, when in the first connector position, non-rotatably engage the holder; and the pair of optical connectors, when in the second connector position, rotatably engage the holder.

13. The cable assembly according to claim 11, wherein each optical connector further comprises:

an end cap attached to the connector housing, the end cap rotatably disposed in the holder and defining a pair of diametrically opposed facets;

wherein, when in the first connector position, the pair of diametrically opposed facets respectively engage one of the spaced clip arms and a flat wall of the holder to prevent rotation of the pair of optical connectors relative to the holder; and wherein, when in the second connector position and with the clip detached from the holder, the pair of diametrically opposed facets are out of engagement with the holder to allow rotation of the pair of optical connectors relative to the holder.

14. The cable assembly according to claim 11, wherein:

the holder comprises first and second parts that attach together to define the pair of connector openings at one end of the holder, the cable opening at an opposing end of the holder, and closed sides;

the first part forms a top of the holder, defines a first opening configured to receive a latch of the clip, and includes a first indicia indicating a first polarity of the duplex optical connector; and the second part forms a bottom of the holder, defines a second opening configured to receive the latch of the clip, and includes a second indicia indicating a second polarity of the duplex optical connector.

15. The cable assembly according to claim 11, wherein the pair of optical connectors are independently rotatable in opposite directions relative to the holder to reverse polarity of the duplex optical connector.

16. The cable assembly according to claim 11, wherein the clip further comprises a latch configured to be received in the holder, and wherein the lever, the spaced clip arms, and the latch are integrally formed.

17. The cable assembly according to claim 11, wherein the cable boot comprises two pairs of spaced ramps, one pair of the spaced ramps provided on each side of the cable boot, and each pair of the spaced ramps recessed relative to its respective side of the cable boot and inclined in a direction of the holder.

18. The cable assembly according to claim 17, wherein the second end of the lever defines a pair of spaced lever arms, each of the spaced lever arms configured to slidably engage one ramp of its respective pair of spaced ramps.

19. The cable assembly according to claim 11, wherein each latch arm is obliquely angled relative to its respective connector housing, biased in a direction away from its respective connector housing, and detached from the first end of the lever.

20. A duplex optical connector, comprising:
a holder;
a pair of optical connectors rotatably disposed in the holder;
a cable boot slidably attached to the holder; and
a clip removably attached to the holder, the clip having a pair of spaced clip arms configured to engage the pair of optical connectors to maintain a lateral position of the optical connectors relative to the holder;
wherein each connector opening is elongated in a lateral direction of the holder to provide a first connector position, in which the pair of optical connectors non-rotatably engage the holder, for use of the pair of optical connectors to perform optical connections, and a second connector position, in which the pair of optical connectors rotatably engage the holder, for polarity reversal.

\* \* \* \* \*